United States Patent
Luke et al.

(10) Patent No.: US 7,296,626 B2
(45) Date of Patent: Nov. 20, 2007

(54) LIQUID ADDITIVE FOR REDUCING WATER-SOLUBLE CHROMATE

(75) Inventors: Karen Luke, Duncan, OK (US); Roger S. Cromwell, Walters, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 29 days.

(21) Appl. No.: 11/269,350

(22) Filed: Nov. 8, 2005

(65) Prior Publication Data

US 2007/0101906 A1    May 10, 2007

(51) Int. Cl.
*E21B 33/13* (2006.01)
*C04B 28/06* (2006.01)
*C04B 28/14* (2006.01)

(52) U.S. Cl. .............. 166/292; 106/292; 106/733; 106/736; 106/772; 106/815; 106/819; 507/271

(58) Field of Classification Search ............... 106/692, 106/733, 736, 772, 815, 819; 166/285, 292, 166/293; 405/266, 267, 270; 507/269, 271; 588/257

See application file for complete search history.

(56) References Cited

U.S. PATENT DOCUMENTS

| | | | |
|---|---|---|---|
| 1,782,353 A * | 11/1930 | Jaeger et al. ............... 502/75 |
| 1,943,584 A | 1/1934 | Cross |
| 2,094,316 A | 9/1937 | Cross et al. |
| 2,131,338 A | 9/1938 | Vail |
| 2,349,049 A | 5/1944 | Means |
| 2,662,827 A | 12/1953 | Clark |
| 2,727,001 A | 12/1955 | Rowe |
| 2,848,051 A | 8/1958 | Williams |
| 3,000,128 A | 9/1961 | Mcada |
| 3,047,493 A | 7/1962 | Rosenberg |
| 3,065,170 A | 11/1962 | Dumbauld et al. |
| 3,115,721 A | 12/1963 | Story |
| 3,179,528 A | 4/1965 | Holmgreen et al. |
| 3,293,040 A | 12/1966 | Shaler, Jr. et al. |
| 3,359,225 A | 12/1967 | Weisend |
| 3,689,927 A | 9/1972 | Boston |
| 3,694,152 A | 9/1972 | Sersale et al. |
| 3,781,225 A | 12/1973 | Schwartz |
| 3,884,302 A | 5/1975 | Messenger |
| 3,887,285 A | 6/1975 | Quist et al. |
| 3,888,998 A | 6/1975 | Sampson et al. |
| 3,963,508 A | 6/1976 | Masaryk |
| 4,054,462 A | 10/1977 | Stude |
| 4,141,843 A | 2/1979 | Watson |
| 4,217,229 A | 8/1980 | Watson |
| 4,363,736 A | 12/1982 | Block |
| 4,372,876 A | 2/1983 | Kulprathipanja et al. |
| 4,415,367 A | 11/1983 | Nelson |
| 4,435,216 A | 3/1984 | Diehl et al. |
| 4,444,668 A | 4/1984 | Walker et al. |
| 4,468,334 A | 8/1984 | Cox et al. |
| 4,474,667 A | 10/1984 | Block |
| 4,482,379 A | 11/1984 | Dibrell et al. |
| 4,515,635 A | 5/1985 | Rao et al. |
| 4,530,402 A | 7/1985 | Smith et al. |
| 4,536,297 A | 8/1985 | Loftin et al. |
| 4,548,734 A | 10/1985 | Chaux |
| 4,552,591 A | 11/1985 | Millar |
| 4,555,269 A | 11/1985 | Rao et al. |
| 4,557,763 A | 12/1985 | George et al. |
| 4,566,214 A | 1/1986 | McCrory et al. |
| 4,632,186 A | 12/1986 | Boncan et al. |
| 4,650,593 A | 3/1987 | Singerland |
| 4,676,317 A | 6/1987 | Fry et al. |
| 4,703,801 A | 11/1987 | Fry et al. |
| 4,717,488 A | 1/1988 | Seheult et al. |
| 4,772,307 A | 9/1988 | Kiss et al. |
| 4,784,691 A | 11/1988 | Rasmussen |
| 4,784,693 A | 11/1988 | Kirkland et al. |
| 4,818,288 A | 4/1989 | Aignesberger et al. |
| 4,888,120 A | 12/1989 | Mueller et al. |
| 4,943,544 A | 7/1990 | McGarry et al. ........... 501/124 |
| 4,986,989 A | 1/1991 | Sirosita et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,151,131 A | 9/1992 | Burkhalter et al. |
| 5,238,064 A | 8/1993 | Dahl et al. |
| 5,252,554 A | 10/1993 | Mueller et al. |
| 5,301,752 A | 4/1994 | Cowan et al. |
| 5,307,876 A | 5/1994 | Cowan et al. |
| 5,314,022 A | 5/1994 | Cowan et al. |
| 5,340,860 A | 8/1994 | Brake et al. |
| 5,346,012 A | 9/1994 | Heathman et al. |
| 5,362,321 A * | 11/1994 | Larsen ..................... 106/713 |
| 5,377,439 A | 1/1995 | Roos et al. |
| 5,383,967 A | 1/1995 | Chase |
| 5,435,846 A | 7/1995 | Tatematsu et al. |

(Continued)

FOREIGN PATENT DOCUMENTS

CA        2153372        9/1996

(Continued)

OTHER PUBLICATIONS

Translation of German Utility Model No. DE 202 07 178 U1, by the McElroy Translation Company, Apr. 2007.*

(Continued)

*Primary Examiner*—George Suchfield
(74) *Attorney, Agent, or Firm*—Craig W. Roddy; Haynes and Boone

(57) ABSTRACT

Methods for cementing and cement compositions are provided, wherein the cement composition comprises cementitious material and an aqueous suspension of zeolite and a chromate reducing agent.

14 Claims, No Drawings

U.S. PATENT DOCUMENTS

| | | |
|---|---|---|
| 5,464,060 A | 11/1995 | Hale et al. |
| 5,494,513 A | 2/1996 | Fu et al. |
| 5,501,276 A | 3/1996 | Weaver et al. |
| 5,527,387 A | 6/1996 | Anderson et al. ........... 106/693 |
| 5,529,624 A | 6/1996 | Riegler |
| 5,566,491 A | 10/1996 | Phillips |
| 5,588,489 A | 12/1996 | Chatterji et al. |
| 5,626,665 A | 5/1997 | Barger et al. |
| 5,658,624 A | 8/1997 | Anderson et al. .......... 428/34.7 |
| 5,680,900 A | 10/1997 | Nguyen et al. |
| 5,711,383 A | 1/1998 | Terry et al. |
| 5,716,910 A | 2/1998 | Totten et al. |
| 5,759,964 A | 6/1998 | Schuchart et al. |
| 5,788,762 A | 8/1998 | Barger et al. |
| 5,789,352 A | 8/1998 | Carpenter et al. |
| 5,807,810 A | 9/1998 | Blezard et al. |
| 5,851,960 A | 12/1998 | Totten et al. |
| 5,866,517 A | 2/1999 | Carpenter et al. |
| 5,913,364 A | 6/1999 | Sweatman |
| 5,964,692 A | 10/1999 | Blezard et al. |
| 5,980,446 A | 11/1999 | Loomis et al. |
| 5,990,052 A | 11/1999 | Harris |
| 6,060,434 A | 5/2000 | Sweatman et al. |
| 6,063,738 A | 5/2000 | Chatterji et al. |
| 6,070,664 A | 6/2000 | Dalrymple et al. |
| 6,138,759 A | 10/2000 | Chatterji et al. |
| 6,145,591 A | 11/2000 | Boncan et al. |
| 6,149,724 A | 11/2000 | Ulibarri et al. |
| 6,153,562 A | 11/2000 | Villar et al. |
| 6,167,967 B1 | 1/2001 | Sweatman |
| 6,170,575 B1 | 1/2001 | Reddy et al. |
| 6,171,386 B1 | 1/2001 | Sabins |
| 6,176,315 B1 | 1/2001 | Reddy et al. |
| 6,182,758 B1 | 2/2001 | Vijn |
| 6,209,646 B1 | 4/2001 | Reddy et al. |
| 6,210,476 B1 | 4/2001 | Chatterji et al. |
| 6,213,213 B1 | 4/2001 | van Batenburg et al. |
| 6,230,804 B1 | 5/2001 | Mueller et al. |
| 6,234,251 B1 | 5/2001 | Chatterji et al. |
| 6,235,809 B1 | 5/2001 | Arias et al. |
| 6,245,142 B1 | 6/2001 | Reddy et al. |
| 6,258,757 B1 | 7/2001 | Sweatman et al. |
| 6,283,213 B1 | 9/2001 | Chan |
| 6,312,515 B1 | 11/2001 | Barlet-Gouedard et al. |
| 6,315,042 B1 | 11/2001 | Griffith et al. |
| 6,372,694 B1 | 4/2002 | Osinga et al. |
| 6,379,456 B1 | 4/2002 | Heathman et al. |
| 6,390,197 B1 | 5/2002 | Maroy |
| 6,405,801 B1 | 6/2002 | Vijn et al. |
| 6,409,819 B1 | 6/2002 | Ko |
| 6,457,524 B1 | 10/2002 | Roddy |
| 6,475,275 B1 | 11/2002 | Nebesnak et al. |
| 6,478,869 B2 | 11/2002 | Reddy et al. |
| 6,488,091 B1 | 12/2002 | Weaver et al. |
| 6,494,951 B1 | 12/2002 | Reddy et al. |
| 6,508,305 B1 | 1/2003 | Brannon et al. |
| 6,524,384 B2 | 2/2003 | Griffith et al. |
| 6,555,505 B1 | 4/2003 | King et al. |
| 6,565,647 B1 | 5/2003 | Day et al. |
| 6,566,310 B2 | 5/2003 | Chan |
| 6,572,698 B1 | 6/2003 | Ko |
| 6,593,402 B2 | 7/2003 | Chatterji et al. |
| 6,607,035 B1 | 8/2003 | Reddy et al. |
| 6,610,139 B2 | 8/2003 | Crook et al. |
| 6,616,753 B2 | 9/2003 | Reddy et al. |
| 6,626,243 B1 | 9/2003 | Boncan |
| 6,626,991 B1 | 9/2003 | Drochon et al. |
| 6,630,021 B2 | 10/2003 | Reddy et al. |
| 6,643,971 B2 | 11/2003 | Daniels |
| 6,645,289 B2 | 11/2003 | Sobolev et al. |
| 6,656,265 B1 | 12/2003 | Garnier et al. |
| 6,656,266 B1 | 12/2003 | Barlet-Gouedard et al. |
| 6,660,080 B2 | 12/2003 | Reddy et al. |
| 6,702,044 B2 | 3/2004 | Reddy et al. |
| 6,713,553 B2 | 3/2004 | Gonnon et al. |
| 6,719,055 B2 | 4/2004 | Mese et al. |
| 6,719,902 B1* | 4/2004 | Alvarez et al. ............. 210/601 |
| 6,722,434 B2 | 4/2004 | Reddy et al. |
| 6,729,405 B2 | 5/2004 | DiLullo et al. |
| 6,737,385 B2 | 5/2004 | Todd et al. |
| 6,743,288 B2 | 6/2004 | Eoff et al. |
| 6,752,866 B2 | 6/2004 | Gonnon et al. |
| 6,767,868 B2 | 7/2004 | Dawson et al. |
| 6,832,652 B1 | 12/2004 | Dillenbeck et al. |
| 6,840,319 B1 | 1/2005 | Chatterji et al. |
| 6,840,996 B2 | 1/2005 | Morioka et al. |
| 6,889,767 B2 | 5/2005 | Reddy et al. |
| 7,005,007 B2* | 2/2006 | Kehrmann ................. 106/733 |
| 7,087,110 B2* | 8/2006 | Jardine et al. ............. 106/713 |
| 7,128,782 B2* | 10/2006 | Jardine et al. ............. 106/730 |
| 7,137,448 B2 | 11/2006 | Arias et al. ................. 466/292 |
| 2001/0014651 A1 | 8/2001 | Reddy et al. |
| 2002/0077390 A1 | 6/2002 | Gonnon et al. |
| 2002/0091177 A1 | 7/2002 | Gonnon et al. |
| 2002/0117090 A1 | 8/2002 | Kusnetsova et al. |
| 2002/0157575 A1 | 10/2002 | DiLullo et al. |
| 2003/0066460 A1 | 4/2003 | Reddy et al. |
| 2003/0092582 A1 | 5/2003 | Reddy et al. |
| 2003/0096945 A1 | 5/2003 | Eoff et al. |
| 2003/0153466 A1 | 8/2003 | Allen et al. |
| 2003/0168215 A1 | 9/2003 | Drochon et al. |
| 2003/0181543 A1 | 9/2003 | Reddy et al. |
| 2003/0203996 A1 | 10/2003 | Gonnon et al. |
| 2003/0217847 A1 | 11/2003 | Reddy et al. |
| 2004/0007162 A1 | 1/2004 | Morioka et al. |
| 2004/0007360 A1 | 1/2004 | Leroy-Delage et al. |
| 2004/0035331 A1 | 2/2004 | Volpert |
| 2004/0040475 A1 | 3/2004 | Roij |
| 2004/0040712 A1 | 3/2004 | Ravi et al. |
| 2004/0069537 A1 | 4/2004 | Reddy et al. |
| 2004/0069538 A1 | 4/2004 | Reddy et al. |
| 2004/0094331 A1 | 5/2004 | Mese et al. |
| 2004/0107877 A1 | 6/2004 | Getzlaf et al. |
| 2004/0108113 A1 | 6/2004 | Luke |
| 2004/0112255 A1 | 6/2004 | Bruno et al. |
| 2004/0112600 A1 | 6/2004 | Luke et al. |
| 2004/0168803 A1 | 9/2004 | Reddy et al. |
| 2004/0188091 A1 | 9/2004 | Luke et al. |
| 2004/0188092 A1 | 9/2004 | Santra et al. |
| 2004/0244977 A1 | 12/2004 | Luke et al. |
| 2004/0262000 A1 | 12/2004 | Morgan et al. |
| 2004/0262001 A1 | 12/2004 | Caveny et al. |
| 2005/0000734 A1 | 1/2005 | Getzlaf et al. |
| 2005/0034864 A1 | 2/2005 | Caveny et al. |
| 2005/0109243 A1 | 5/2005 | Luke et al. |
| 2005/0133222 A1 | 6/2005 | Arias et al. |
| 2006/0025312 A1 | 2/2006 | Santra et al. |
| 2006/0094921 A1* | 5/2006 | Roper, Jr. .................. 588/257 |

FOREIGN PATENT DOCUMENTS

| | | |
|---|---|---|
| DE | 202 07 178 U1 | 8/2002 |
| EP | 0 621 247 B1 | 7/1990 |
| EP | 0 802 253 A1 | 10/1997 |
| EP | 0 895 971 A1 | 2/1999 |
| EP | 1 260 491 A1 | 11/2002 |
| EP | 1 428 805 A1 | 4/2003 |
| EP | 1 428 805 A1 | 6/2004 |
| EP | 1 533 287 A1 | 5/2005 |
| EP | 1 544 182 A1 | 6/2005 |
| FR | 763.998 | 5/1937 |
| GB | 1469954 | 4/1977 |
| GB | 2 353 523 A | 2/2001 |
| JP | 52117316 | 10/1977 |

| | | |
|---|---|---|
| JP | 61021947 A | 1/1986 |
| JP | 07003254 | 6/1995 |
| JP | 10110487 | 4/1998 |
| SU | 1373781 | 2/1988 |
| WO | WO 97/28097 | 8/1997 |
| WO | WO 98/54108 | 12/1998 |
| WO | WO 00/50357 | 8/2000 |
| WO | WO 01/70646 A1 | 9/2001 |
| WO | WO 2005/059301 A1 | 6/2005 |

OTHER PUBLICATIONS

Luke, Karen et al., "Drilling and Cementing With Fluids Containing Zeolite," filed Nov. 9, 2005 as U.S. Appl. No. 11/270,370.

Luke, Karen et al., "Zeolite-Containing Drilling Fluids," filed Oct. 9, 2006 as U.S. Appl. No. 11/544,691.

Luke, Karen et al., "Fluid Loss Additives For Cement Slurries," filed Oct. 10, 2006 as U.S. Appl. No. 11/545,392.

Fyten, Glen et al., "Cementitious Compositions Containing Interground Cement Clinker and Zeolite" filed Nov. 8, 2006 as U.S. Appl. No. 11/594,435.

Fyten, Glen et al., "Cementitious Compositions Containing Interground Cement Clinker and Zeolite" filed Nov. 8, 2006 as U.S. Appl. No. 11/594,326.

Fyten, Glen et al., "Cementitious Compositions Containing Interground Cement Clinker and Zeolite" filed Nov. 8, 2006 as U.S. Appl. No. 11/594,430.

Foreign communication related to a counterpart application dated Dec. 27, 2006.

Baroid brochure entitled "Aquagel Gold Seal®" dated 2002.

Baroid Fluid Services brochure entitled "BARAZAN® Viscosifier/Suspension Agent" dated 2005.

Halliburton brochure entitled "CFR-2 Cement Friction Reducer" dated 1999.

Halliburton brochure entitled "CFR-3 Cement Friction Reducer" dated 1998.

Halliburton brochure entitled "D-Air 2 Anti-Foam Agent" dated 1999.

Baroid Fluid Services brochure entitled "DURATONE® HT Filtration Control Agent" dated 2005.

Baroid Fluid Services brochure entitled "EZ-MUD® Shale Stabilizer" dated 2005.

Baroid Fluid Services brochure entitled "EZ MUL® Emulsifier" dated 2005.

Baroid Fluid Services brochure entitled "EZ MUL® NTE Emulsifier" dated 2005.

Baroid Fluid Services brochure entitled "GELTONE® II Viscosifier" dated 2005.

Baroid Fluid Services brochure entitled "GELTONE® V Viscosifier" dated 2005.

Halliburton brochure entitled "Halad®-344 Fluid-Loss Additive" dated 1998.

Halliburton brochure entitled "Halad®-413 Fluid-Loss Additive" dated 1999.

Halliburton brochure entitled "HR®-5 Cement Additive" dated 1998.

Halliburton brochure entitled "HR®-7 Cement Retarder" dated 1999.

Baroid Fluid Services brochure entitled "INVERMUL® Emulsifier" dated 2005.

Halliburton brochure entitled "MICROSAND Cement Additive" dated 1999.

Halliburton brochure entitled "SSA-1Strength-Stabilizing Agent" dated 1998.

Halliburton brochure entitled "SSA-2 Coarse Silica Flour" dated 1999.

"Hydraulic engineering cement", International Center for Materials Technology Promotion, 2003.

"Portland Cement, Concrete, and Heat of Hydration", Portland Cement Association, Concrete Technology Today, vol. 18, No. 2, 1997.

Powder Diffraction File, International Centre for Diffraction Data, 2002.

Underdown, D.R. et al., "Acidization of Analcime-Cemented Sandstone, Gulf of Mexico", SPE 20624, dated 1990.

Rogers, B.A. et al., "Designing a Remedial Acid Treatment for Gulf of Mexico Deepwater Turbidite Sands Containing Zeolite Cement," SPE 39595, dated 1998.

Bruhn, R.L. et al., "Tectonics, fluid migration, and fluid pressure in a deformed forearc basin, Cook Inlet, Alaska," dated 2000.

Komarneni, S. et al., "Alteration of Clay Minerals and Zeolites in Hydrothermaly Brines" dated 1983.

Poon, C.S. et al., "A study on the hydratino rate of natural zeolite blended cement pastes" dated 1999.

Feng, N-Q et al., "Zeolite ceramsite cellular concrete" pp. 117-112, dated 2000.

Bagosi, S. et al., "Immobilization of caesium-loaded ion exchange resins in zeolite-cement blends" pp. 479-485,d ated 1999.

"Effect of Bentonite and Zeolite on Durability of Cement Suspension under Sulfate Attack," ACI Materials Journal, pp. 710-715, dated 1998.

Su, N. et al., "Reuse of waste catalysts from petrochemical industries for cement substitution," pp. 1773-1783, dated 2000.

Ding, Jian-Tong et al., "Extreme vertices design of concrete with combined mineral admixtures," dated 1999.

Naiqian, F. et al., "Study on the suppression effect of natural zeolite on expansion of concrete due to alkali-aggregate reaction," pp. 17-24, dated 1998.

Poon, C.S. et al., "A study on the hydration rate of natural zeolite blended cement pastes," pp. 427-732, dated 1999.

* cited by examiner

LIQUID ADDITIVE FOR REDUCING WATER-SOLUBLE CHROMATE

BACKGROUND

The present embodiment relates generally to cement compositions and methods for cementing an area using such cement compositions. In certain examples, methods for cementing in a subterranean zone are described.

In the drilling and completion of an oil or gas well, a cement composition is often introduced in the wellbore for cementing pipe string or casing. When the desired drilling depth of the well is reached, a cement composition is pumped into the annular space between the walls of the wellbore and the casing. The cement composition sets in the annular space, supporting and positioning the casing, and forming a substantially impermeable barrier, or cement sheath, which isolates the wellbore from subterranean zones.

Most cements contain chromium compounds because the raw material (typically shale) from which cements are made usually contains chromium compounds. When the cements are mixed with water, the chromium compounds appear as $Cr^{+6}$ (chromate) dissolved in the water. The dissolved chromate presents a health risk to humans, for example, allergic reactions.

Ferrous sulfate is known to reduce $Cr^{+6}$ to $Cr^{+3}$, which is less soluble in cement-water mixtures. Ferrous sulfate has been dry blended with cement during the manufacturing of the cement, but in such a blend, the ferrous sulfate remains effective for only a limited period of time. In addition, the solubility of ferrous sulfate is such that it will settle out of solution if formulated as a liquid additive.

DESCRIPTION

According to embodiments described herein, methods of cementing an area are provided. Certain methods include preparing a cement composition by mixing a cementitious material with water and an aqueous suspension comprising water, zeolite and a chromate reducing agent, placing the cement composition in the area, and allowing the cement composition to set therein.

According to some embodiments, the aqueous suspension comprises zeolite in an amount of from about 67 weight percent to about 100 weight percent by weight of the water, and chromate reducing agent in an amount that is from about 42 weight percent to about 167 weight percent by weight of the zeolite and from about 28 weight percent to about 111 weight percent by weight of the water in the aqueous suspension.

According to other embodiments, the aqueous suspension comprises zeolite in an amount of more than about 56 weight percent to less than about 111 weight percent of the weight of the water, and chromate reducing agent in an amount that is about 111 weight percent of the weight of the water, and more than about 100 weight percent to about 167 weight percent of the weight of the zeolite.

According to still other embodiments, the aqueous suspension comprises zeolite in an amount of about 67 weight percent to about 100 weight percent of the weight of the water, and chromate reducing agent in an amount that is from more than about 100 weight percent to about 111 weight percent of the weight of the water, and about 167 weight percent of the weight of the zeolite.

According to still further embodiments, the aqueous suspension comprises zeolite in an amount of about 67 weight percent of the weight of the water, and chromate reducing agent in an amount that is from about 56 weight percent to about 111 weight percent of the weight of the water, and from about 83 weight percent to about 167 weight percent of the weight of the zeolite.

According to certain embodiments described herein, an aqueous suspension comprises water, zeolite and stannous sulfate or ferrous sulfate as a chromate reducing agent. The ferrous sulfate can be any of the hydrates of ferrous sulfate, such as the monohydrate ($FeSO_4.H_2O$), the tetrahydrate ($FeSO_4.4H_2O$), the pentahydrate ($FeSO_4.5H_2O$), and the heptahydrate ($FeSO_4.7H_2O$). Hydrated forms of stannous sulfate, if any, could also prove to be suitable.

According to certain embodiments, the zeolite in the aqueous suspension is one or more of analcime (hydrated sodium aluminum silicate), bikitaite (lithium aluminum silicate), brewsterite (hydrated strontium barium calcium aluminum silicate), chabazite (hydrated calcium aluminum silicate), clinoptilolite (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), stilbite (hydrated sodium calcium aluminum silicate) and thomsonite (hydrated sodium calcium aluminum silicate).

Zeolites are porous alumino-silicate minerals that may be either a natural or manmade material. Manmade zeolites are based on the same type of structural cell as natural zeolites and are composed of aluminosilicate hydrates having the same basic formula as given below. It is understood that as used in this application, the term "zeolite" means and encompasses all natural and manmade forms of zeolites. All zeolites are composed of a three-dimensional framework of $SiO_4$ and $AlO_4$ in a tetrahedron, which creates a very high surface area. Cations and water molecules are entrained into the framework. Thus, all zeolites may be represented by the crystallographic unit cell formula:

$$M_{a/n}[(AlO_2)_a(SiO_2)_b].xH_2O$$

where M represents one or more cations such as Na, K, Mg, Ca, Sr, Li or Ba for natural zeolites and $NH_4$, $CH_3NH_3$, $(CH_3)_3NH$, $(CH_3)_4N$, Ga, Ge and P for manmade zeolites; n represents the cation valence; the ratio of b:a is in a range of from greater than or equal to 1 to less than or equal to 5; and x represents the moles of water entrained into the zeolite framework.

Compositions for cementing are also described herein. According to certain embodiments, the compositions comprise cementitious material and an aqueous suspension of water, zeolite and a chromate reducing agent. According to certain embodiments, the aqueous suspension is present in the cement composition in an amount sufficient to provide the cement composition with a chromate reducing agent content of up to about 0.5% by weight of the cementitious material.

A variety of cementitious materials can be used with the present embodiments, including but not limited to hydraulic cements. Hydraulic cements set and harden by reaction with water, and are typically comprised of calcium, aluminum, silicon, oxygen, and/or sulfur. Hydraulic cements include Portland cements, pozzolan cements, gypsum cements, aluminous cements, silica cements, and alkaline cements. According to certain examples, the cementitious material comprises at least one API Portland cement. As used herein, the term API Portland cement means any cement of the type defined and described in API Specification 10A, 23rd Edition, Oct. 1, 2002, of the American Petroleum Institute, (ANSI/API 10A/ISO 10426-1-2001) such as Classes A, B, C, G, and H.

Water in the cement compositions according to the present embodiments is present in an amount sufficient to make a slurry of a desired density. The water used to form a slurry can be fresh water, unsaturated salt solution, including brines and seawater, and saturated salt solution. Generally, any type of water can be used, provided that it does not contain an excess of compounds that are well known to those skilled in the art to adversely affect properties of the cement composition. In certain embodiments, the water is present in an amount of about 20% to about 150% by weight of the cementitious material in the cement composition.

A variety of additives may be added to a cement composition that includes an aqueous suspension of zeolite and a chromate reducing agent. Such additives include density modifying materials (e.g., fly ash, silica flour, sodium silicate, microfine sand, iron oxides and manganese oxides), dispersing agents, set retarding agents, set accelerating agents, fluid loss control agents, strength retrogression control agents, and viscosifying agents, all of which are well known to those of ordinary skill in the art.

The following examples are illustrative of the methods and compositions discussed above.

EXAMPLE 1

Components of the types and amounts reported in Table 1A were mixed to form Sample Nos. 1-45. The chromate reducing agent ("CRA") was $SnSO_4$ or $FeSO_4 \cdot 7H_2O$ as indicated in the table. $SnSO_4$ and $FeSO_4 \cdot 7H_2O$ were each obtained from Fisher Laboratory Chemicals. The zeolite used in Sample Nos. 1-45 was chabazite, which was mined from Bowie, Ariz., USA and obtained from C2C Zeolite Corporation, Calgary, Canada. The water used to form the suspensions was tap water.

The reported amount of chromate reducing agent and the reported amount of zeolite were weighed and added to a glass beaker. The reported amount of water (grams) was added to the beaker, and the chromate reducing agent, zeolite and water in the beaker were hand mixed with a stirring rod at room temperature. The amounts of chromate reducing agent and zeolite are reported in grams, and also in a weight percent of the total weight of the mixture (chromate reducing agent, zeolite and water).

Also reported in Table 1A are: the percentage of zeolite in the mixture, expressed as a weight percentage of the weight of water in the mixture, and the percentage of reducing agent in the mixture, expressed as a weight percentage of the weight of water in the mixture, and as a weight percentage of the weight of zeolite in the mixture.

The notes reported in Table 1A indicate whether the samples settled within 24 hours of visual observation.

TABLE 1A

| No. | Reducing agent | CRA (g) | Zeolite (g) | Water (g) | CRA (wt. %) | Zeolite (wt. %) | CRA/Water (%) | CRA/Zeolite (%) | Zeolite/Water (%) | Notes |
|---|---|---|---|---|---|---|---|---|---|---|
| 1 | $SnSO_4$ | 12.50 | 0.00 | 12.50 | 50 | 0 | 100 | 0 | 0 | Solids settled/free water |
| 2 | $FeSO_4 \cdot 7H_2O$ | 10.00 | 6.00 | 4.00 | 50 | 30 | 250 | 167 | 150 | Barely mixable |
| 3 | $FeSO_4 \cdot 7H_2O$ | 10.00 | 10.00 | 9.00 | 34 | 34 | 111 | 100 | 111 | Barely mixable - thixotropic |
| 4 | $FeSO_4 \cdot 7H_2O$ | 5.00 | 12.00 | 9.00 | 19 | 46 | 56 | 42 | 133 | Barely mixable - thixotropic |
| 5 | $FeSO_4 \cdot 7H_2O$ | 15.00 | 12.00 | 9.00 | 42 | 33 | 167 | 125 | 133 | Barely mixable - thixotropic |
| 6 | $FeSO_4 \cdot 7H_2O$ | 5.00 | 12.00 | 9.00 | 19 | 46 | 56 | 42 | 133 | Barely mixable - thixotropic |
| 7 | $FeSO_4 \cdot 7H_2O$ | 10.00 | 9.00 | 6.00 | 40 | 36 | 167 | 111 | 150 | Barely mixable - thixotropic |
| 8 | $SnSO_4$ | 10.00 | 6.00 | 9.00 | 40 | 24 | 111 | 167 | 67 | No settling |
| 9 | $FeSO_4 \cdot 7H_2O$ | 10.00 | 6.00 | 9.00 | 40 | 24 | 111 | 167 | 67 | No settling |
| 10 | $FeSO_4 \cdot 7H_2O$ | 10.00 | 8.00 | 9.00 | 37 | 30 | 111 | 125 | 89 | No settling |
| 11 | $FeSO_4 \cdot 7H_2O$ | 10.00 | 9.00 | 9.00 | 36 | 32 | 111 | 111 | 100 | No settling |
| 12 | $FeSO_4 \cdot 7H_2O$ | 10.00 | 12.00 | 18.00 | 25 | 30 | 56 | 83 | 67 | No settling |
| 13 | $FeSO_4 \cdot 7H_2O$ | 7.00 | 6.00 | 9.00 | 25 | 30 | 78 | 117 | 67 | No settling |
| 14 | $FeSO_4 \cdot 7H_2O$ | 5.00 | 6.00 | 9.00 | 25 | 30 | 56 | 83 | 67 | No settling |
| 15 | $FeSO_4 \cdot 7H_2O$ | 5.00 | 12.00 | 18.00 | 14 | 34 | 28 | 42 | 67 | No settling |
| 16 | $FeSO_4 \cdot 7H_2O$ | 10.00 | 9.00 | 9.00 | 36 | 32 | 111 | 111 | 100 | No settling |
| 17 | $FeSO_4 \cdot 7H_2O$ | 10.00 | 9.00 | 12.00 | 32 | 29 | 83 | 111 | 75 | No settling |
| 18 | $FeSO_4 \cdot 7H_2O$ | 5.00 | 6.00 | 9.00 | 25 | 30 | 56 | 83 | 67 | No settling |
| 19 | $SnSO_4$ | 12.50 | 12.50 | 12.50 | 33 | 33 | 100 | 100 | 100 | No settling |
| 20 | $SnSO_4$ | 12.50 | 4.00 | 8.50 | 50 | 16 | 147 | 313 | 47 | Settling |
| 21 | $SnSO_4$ | 10.00 | 4.80 | 10.20 | 40 | 19 | 98 | 208 | 47 | Settling |
| 22 | $FeSO_4 \cdot 7H_2O$ | 10.00 | 5.00 | 9.00 | 42 | 21 | 111 | 200 | 56 | Settling |
| 23 | $FeSO_4 \cdot 7H_2O$ | 10.00 | 6.00 | 10.00 | 38 | 23 | 100 | 167 | 60 | Settling |
| 24 | $FeSO_4 \cdot 7H_2O$ | 12.00 | 6.00 | 9.00 | 44 | 22 | 133 | 200 | 67 | Settling |
| 25 | $SnSO_4$ | 12.50 | 3.50 | 9.00 | 50 | 14 | 139 | 357 | 39 | Settling |
| 26 | $FeSO_4 \cdot 7H_2O$ | 15.00 | 6.00 | 9.00 | 50 | 20 | 167 | 250 | 67 | Settling |

TABLE 1A-continued

| No. | Reducing agent | CRA (g) | Zeolite (g) | Water (g) | CRA (wt. %) | Zeolite (wt. %) | CRA/Water (%) | CRA/Zeolite (%) | Zeolite/Water (%) | Notes |
|---|---|---|---|---|---|---|---|---|---|---|
| 27 | $FeSO_4 \cdot 7H_2O$ | 15.00 | 9.00 | 12.00 | 42 | 25 | 125 | 167 | 75 | Settling |
| 28 | $FeSO_4 \cdot 7H_2O$ | 15.00 | 6.00 | 9.00 | 50 | 20 | 167 | 250 | 67 | Settling |
| 29 | $FeSO_4 \cdot 7H_2O$ | 5.00 | 6.00 | 12.00 | 22 | 26 | 42 | 83 | 50 | Settling |
| 30 | $FeSO_4 \cdot 7H_2O$ | 15.00 | 9.00 | 12.00 | 42 | 25 | 125 | 167 | 75 | Settling |
| 31 | $SnSO_4$ | 12.50 | 6.25 | 12.50 | 40 | 20 | 100 | 200 | 50 | Severe settling |
| 32 | $SnSO_4$ | 12.50 | 2.50 | 10.00 | 50 | 10 | 125 | 500 | 25 | Severe settling |
| 33 | $FeSO_4 \cdot 7H_2O$ | 10.00 | 3.00 | 9.00 | 45 | 14 | 111 | 333 | 33 | Severe settling |
| 34 | $FeSO_4 \cdot 7H_2O$ | 5.00 | 3.00 | 9.00 | 29 | 18 | 56 | 167 | 33 | Severe settling |
| 35 | $FeSO_4 \cdot 7H_2O$ | 15.00 | 3.00 | 9.00 | 56 | 11 | 167 | 500 | 33 | Severe settling |
| 36 | $FeSO_4 \cdot 7H_2O$ | 10.00 | 3.00 | 9.00 | 45 | 14 | 111 | 333 | 33 | Severe settling |
| 37 | $SnSO_4$ | 16.50 | 16.08 | 33.50 | 24 | 24 | 49 | 103 | 48 | Slight settling |
| 38 | $SnSO_4$ | 8.25 | 8.00 | 16.75 | 25 | 24 | 49 | 103 | 48 | Slight settling |
| 39 | $FeSO_4 \cdot 7H_2O$ | 10.00 | 6.00 | 6.00 | 45 | 27 | 167 | 167 | 100 | Slight settling |
| 40 | $FeSO_4 \cdot 7H_2O$ | 10.00 | 6.00 | 6.00 | 45 | 27 | 167 | 167 | 100 | Slight settling |
| 41 | $FeSO_4 \cdot 7H_2O$ | 15.00 | 12.00 | 18.00 | 33 | 27 | 83 | 125 | 67 | Slight settling |
| 42 | $SnSO_4$ | 12.50 | 12.50 | 6.25 | 40 | 40 | 200 | 100 | 200 | Unmixable |
| 43 | $SnSO_4$ | 12.50 | 9.375 | 9.375 | 40 | 30 | 133 | 133 | 100 | Very thixotropic |
| 44 | $SnSO_4$ | 12.50 | 6.25 | 6.25 | 50 | 25 | 200 | 200 | 100 | Very thixotropic |
| 45 | $SnSO_4$ | 12.50 | 8.00 | 4.50 | 50 | 18 | 278 | 156 | 177 | Very thixotropic |

The settling observations reported in Table 1A indicate that with sufficient zeolite to water ratios, chromate reducing agent to water ratios and chromate reducing agent to zeolite ratios, a chromate reducing agent can be formulated as an aqueous suspension having sufficient suspension and thixotropic properties for use in preparing cement compositions as will be described further in Example 2.

In particular, Sample Nos. 8-18 reported in Table 1A illustrate that aqueous suspensions of a chromate reducing agent can be made with zeolite in an amount of from about 67 weight percent to about 100 weight percent of the weight of the water, and chromate reducing agent in an amount that is from about 42 weight percent to about 167 weight percent of the weight of the zeolite, and from about 28 weight percent to about 111 weight percent of the weight of the water in the aqueous suspension.

Sample Nos. 3, 8-11, 16 and 21 illustrate that aqueous suspensions of a chromate educing agent can be made with zeolite in an amount of more than about 56 weight percent to less than about 111 weight percent of the weight of the water, and chromate reducing agent in an amount that is about 111 weight percent of the weight of the water, and more than about 100 weight percent to about 167 weight percent of the weight of the zeolite.

Sample Nos. 2, 8, 9, 22 and 39 illustrate that aqueous suspensions of a chromate reducing agent can be made with zeolite in an amount of about 67 weight percent to about 100 weight percent of the weight of the water, and chromate reducing agent in an amount that is from more than about 100 weight percent to about 111 weight percent of the weight of the water, and about 167 weight percent of the weight of the zeolite.

Sample Nos. 8, 9, 13, 18, 23, 25 and 27 illustrate that aqueous suspensions of a chromate reducing agent can be made with zeolite in an amount of about 67 weight percent of the weight of the water, and chromate reducing agent in an amount that is from about 56 weight percent to about 111 weight percent of the weight of the water, and from about 83 weight percent to about 167 weight percent of the weight of the zeolite.

Sample Nos. 8, 9 and 36 were visually observed for a period of 14 days to determine whether settling would occur over time. The results of the observations are reported in Table 1B, where "n/a" indicates that no observation was recorded.

TABLE 1B

| | Time (days) | | | | | | | | |
|---|---|---|---|---|---|---|---|---|---|
| Sample No. | 0 | 2 | 4 | 5 | 7 | 8 | 10 | 11 | 14 |
| 8 | No settling | No settling | No settling | No settling | n/a | n/a | n/a | n/a | Slight settling |
| 9 | No settling | n/a | n/a | n/a | n/a | No settling | n/a | n/a | Slight settling |
| 36 | Slight settling | n/a | n/a | Slight settling | n/a | n/a | Slight settling | Viscous | n/a |

Table 1B indicates that aqueous suspensions of chromate reducing agent as described herein are stable.

EXAMPLE 2

Cement compositions comprising a cementitious material, a chromate reducing agent and water were prepared. The water used in this example was distilled and deionized. For certain compositions, the chromate reducing agent was included in the composition as an aqueous suspension that included zeolite. The type and amount of cementitious material, the type and amount of chromate reducing agent, and whether the chromate reducing agent was formulated as an aqueous suspension is reported in Table 2.

TABLE 2

| No. | Cementitious Material Type and Amount | Reducing Agent Type (dry) and Amount | Reducing Agent Type (40% by weight of an aqueous suspension) and Amount | Water (mL) | $Cr^{+6}$ content ($mgL^{-1}$) |
|---|---|---|---|---|---|
| 1  | A 25 g | 0                                  | 0                                  | 25 | 5.68  |
| 2  | A 25 g | $SnSO_4$ (0.35% bwoc)              | 0                                  | 25 | 0.032 |
| 3  | A 25 g | 0                                  | $SnSO_4$ (0.35% bwoc)              | 25 | 0.030 |
| 4  | A 25 g | $FeSO_4 \cdot 7H_2O$ (0.5% bwoc)   | 0                                  | 25 | 0.016 |
| 5  | A 25 g | 0                                  | $FeSO_4 \cdot 7H_2O$ (0.5% bwoc)   | 25 | 0.012 |
| 6  | B 25 g | 0                                  | 0                                  | 25 | 2.65  |
| 7  | B 25 g | $SnSO_4$ (0.35% bwoc)              | 0                                  | 25 | 0.019 |
| 8  | B 25 g | 0                                  | $SnSO_4$ (0.35% bwoc)              | 25 | 0.030 |
| 9  | B 25 g | $FeSO_4 \cdot 7H_2O$ (0.5% bwoc)   | 0                                  | 25 | 0.020 |
| 10 | B 25 g | 0                                  | $FeSO_4 \cdot 7H_2O$ (0.5% bwoc)   | 25 | 0.005 |
| 11 | C 25 g | 0                                  | 0                                  | 25 | 5.19  |
| 12 | C 25 g | $SnSO_4$ (0.35% bwoc)              | 0                                  | 25 | 0.067 |
| 13 | C 25 g | 0                                  | $SnSO_4$ (0.35% bwoc)              | 25 | 0.017 |
| 14 | C 25 g | $FeSO_4 \cdot 7H_2O$ (0.5% bwoc)   | 0                                  | 25 | 0.013 |
| 15 | C 25 g | 0                                  | $FeSO_4 \cdot 7H_2O$ (0.5% bwoc)   | 25 | 0.013 |

Cementitious material A = API Class G cement from Lafarge Corp.
Cementitious material B = API Class G cement from Dyckerhoff AG
Cementitious material C = API Class G cement from Norcem AS Composition Nos. 2, 4, 7, 9, 12 and 14 were prepared with the reported amount and type of cementitious material, and the reported amount and type of chromate reducing agent, which was mixed with the cementitious material as a "dry" additive, rather than as an aqueous suspension. The cementitious material, chromate reducing agent and water were measured into a glass jar, and mixed by hand at room temperature. The amount of chromate reducing agent is reported as a percent based on the total weight of the cementitious material (bwoc), or in other words, an amount that is 0.35% or 0.5% of the 25 grams of cementitious material.

Composition Nos. 3, 5, 8, 10, 13 and 15 were prepared using aqueous suspensions that included zeolite in an amount of about 67 percent by weight of water in the suspension, and the reported chromate reducing agent in an amount that was about 167 percent by weight of the zeolite and about 111 percent by weight of the water in the suspension (which is an aqueous suspension of about 40 weight percent chromate reducing agent, about 24 weight percent zeolite and about 36 weight percent water).

The zeolite used in the aqueous suspensions was chabazite, which was mined from Bowie, Ariz., USA and obtained from C2C Zeolite Corporation, Calgary, Canada. The suspensions were mixed according to the methods described in Example 1. Namely, the reported chromate reducing agent, zeolite and water were mixed with a stirring rod in a glass beaker at room temperature.

The aqueous suspensions were mixed with the reported amounts of cementitious material and water to form the compositions. The water was measured into a glass jar, and the aqueous suspension was added to the jar in an amount of 0.218 grams (which, when expressed as a volume, is about 0.15 mL of the ferrous sulfate suspension and about 0.12 mL for the stannous sulfate suspension, or when expressed by the weight of the cementitious material (bwoc) to be added (25 grams), is about 0.35% for the ferrous sulfate suspension and about 0.5% for the stannous sulfate suspension.) After addition of the suspension, the mixture was stirred for about one minute at room temperature. The reported amount of cementitious material (25 grams) was then added to the jar and mixing continued.

Composition Nos. 1, 6 and 11 did not contain a chromate reducing agent, and served as a control for the remaining compositions.

The $Cr^{+6}$ content of each composition was determined using a Hach DR 4000 Spectrometer and 1,5-diphenylcarbohydrazide reagent. To prepare the samples for spectral analysis, each composition was stirred with a magnetic stirring bar for about 15 minutes, followed by filtering and acidification of the filtrate with sulfuric acid to a pH of about 2.

Per Method 8023 of the manufacturer's procedures for operation of the Hach DR 4000 Spectrometer, sample cells were then filled with the acidified filtrate, and a 65 mg powder pillow of the 1,5-diphenylcarbohydrazide reagent (available under the tradename "ChromaVer 3" Reagent Powder Pillow) was added to each cell. The $Cr^{+6}$ concentration of the reacted filtrate was then determined by ultraviolet-visible spectroscopy, per Method 8023 of the manufacturer's procedures for operation of the Hach DR 4000 Spectrometer.

The concentrations of $Cr^{+6}$ reported in Table 2 indicate that aqueous suspensions of chromate reducing agent are effective for reducing the $Cr^{+6}$ content of cement compositions. In addition, as described in Example 3, the inclusion in cement compositions of chromate reducing agents formulated in an aqueous suspension included zeolite does not adversely affect the suitability of such cement compositions for use in sealing in a subterranean zone penetrated by a well bore.

EXAMPLE 3

Referring now to Table 3A, various properties of cement compositions that include a chromate reducing agent formulated as an aqueous suspension as described herein are reported. In particular, Table 3A describes rheological data, thickening times and free water data of cement compositions comprising stannous sulfate or ferrous sulfate, each of which is formulated as an aqueous suspension comprising zeolite.

The rheological data reported in Table 3A was obtained generally according to the procedures set forth in Section 12 of the API Specification RP 10B, 22nd Edition, 1997, of the American Petroleum Institute. Generally according to such procedure, dial readings on a Fann Model 35 viscometer were read at the different rotational speeds and temperatures reported in Table 3A. For example, the Fann viscometer is rotated at 300 RPM (revolutions per minute) for 60 seconds and a value on the dial is read, the speed is then changed to 200 RPM and the new value on the dial reading taken.

Thickening times ("TT") were determined using a Well Simulation Thickening Time test described in API Specification 10B 22nd Edition, 1997, of the American Petroleum Institute. The thickening time reported in Table 3A is that amount of time (hours:minutes) that it took the composition to attain 70 Bearden units of consistency ($B_c$) in a high pressure consistometer, as described in API Specification 10B noted above.

Free water data was gathered according to Section 15.5 of Addendum 2 of the API Specification 10B 22nd Edition, 1997, of the American Petroleum Institute. Generally according to this API Specification, 250 ml of each cement composition was poured into its own 250 ml graduated glass cylinder and then sealed with a plastic film wrap to prevent evaporation. A two-hour test period was then initiated, in which the graduated cylinders were left standing. After two hours, the free fluid that had gathered on top of each cement composition inside the cylinder was measured. The percent aqueous suspension used in the composition, by weight of the cementitious material used in the composition.

Certain of the cement compositions, as reported below, included dispersants, retarders and viscosifiers. In particular, additives bearing the tradenames CFR-3™, Econolite™ liquid, SSA-1™ and HR-4L™ were used in certain compositions of this Example 3. Bentonite was also used in certain compositions. CFR-3™ is the tradename for a dispersant commercially available from Halliburton Energy Services, Duncan, Okla., and comprises a condensation product of formaldehyde, acetone and a sulfite. Econolite™ liquid is the tradename for a lightweight additive commercially available from Halliburton Energy Services, Duncan, Okla., and comprises sodium silicate. SSA-1™ is the tradename for a strength retrogression additive commercially available from Halliburton Energy Services, Duncan, Okla., and comprises silica flour. HR-4L™ is the tradename for a retarder commercially available from Halliburton Energy Services, Duncan, Okla., and comprises an aqueous solution of an unrefined lignosulfonate. Bentonite is a montmorillonite clay commercially available from Halliburton Energy Services, Duncan, Okla. Bentonite was used in the examples herein as a viscosifier.

TABLE 3A

| No. | Type of Reducing Agent (in a Aq. Susp.) | Amt. of Reducing Agent (Aq. Susp.) in Comp. | Rheo Test Temp (° C.) | Rheological data - reading at rpm | | | | | | | | TT to 70 $B_c$ (Hr:min) | Free water (%) |
|---|---|---|---|---|---|---|---|---|---|---|---|---|---|
| | | | | 600 | 300 | 200 | 100 | 60 | 30 | 6 | 3 | | |
| 1A | none | 0 | 80 | 98 | 64 | 54 | 40 | 33 | 28 | 17 | 15.5 | n/a | n/a |
| 1B | SnSO$_4$ | 0.479L/100 Kg (0.87% bwoc) | 80 | 75 | 49 | 42 | 32 | 29 | 26 | 18 | 16.5 | n/a | n/a |
| 2A | none | 0 | 123 | 15 | 11 | 9 | 8 | 7 | 6 | 5 | 4 | 6:04 | 18 |
| 2B | SnSO$_4$ | 0.479 L/100 Kg (0.87% bwoc) | 123 | 13 | 7.5 | 6.5 | 5.5 | 4.5 | 4 | 3 | 2.5 | 3:49 | 16 |
| 3A | SnSO$_4$ | 0.479 L/100 Kg (0.87% bwoc) | 80 | 22 | 16 | 13 | 9 | 8 | 7 | 4.5 | 3.5 | 9:47 | n/a |
| 3B | SnSO$_4$ | 0.479 L/100 Kg (0.87% bwoc) | 98 | 22 | 16 | 13 | 9 | 8 | 7 | 4.5 | 3 | 10:22 | n/a |
| 4A | none | 0 | 80 | 99 | 65 | 57 | 45 | 40 | 35 | 24 | 21 | 5:47 | n/a |
| 4B | FeSO$_4$•7H$_2$O | 0.888 L/100Kg (1.32% bwoc) | 80 | 115 | 75 | 65 | 49 | 42 | 35 | 23 | 17 | 5:25 | n/a |
| 5A | none | 0 | 123 | 15 | 11 | 9 | 8 | 7 | 6 | 5 | 4 | 5:09 | 18 |
| 5B | FeSO$_4$•7H$_2$O | 0.888 L/100 Kg (1.32% bwoc) | 123 | 10 | 5 | 4 | 3 | 2 | 2 | 1 | 1 | 5:25 | 4 |
| 6A | none | 0 | 80 | 22 | 15 | 12 | 9 | 7 | 6 | 4 | 3 | n/a | n/a |
| 6B | FeSO$_4$•7H$_2$O | 0.888 L/100 Kg (1.32% bwoc) | 80 | 24 | 15 | 12 | 8.5 | 7 | 6 | 4 | 3.5 | n/a | n/a |
| 7A | none | 0 | 98 | n/a | n/a | n/a | n/a | n/a | n/a | n/a | n/a | 9:47 | 20 |
| 7B | FeSO$_4$•7H$_2$O | 0.888 L/100 Kg (1.32% bwoc) | 98 | n/a | n/a | n/a | n/a | n/a | n/a | n/a | n/a | 9:04 | 10 | of free fluid was calculated as the measured milliliters of free fluid multiplied by 100 and then divided by the initial 250 milliliters of the cement composition.

"n/a" indicates that the particular measurement was not recorded.

The cementitious material used to prepare each of Composition Nos. 1A-7B reported in Table 3A was API Class G cement from Dyckerhoff AG. The water used to prepare the compositions was tap water.

The amount of the aqueous suspension of a chromate reducing agent used to form the compositions is reported in Table 3A in "L/100 Kg", which describes the volume of the aqueous suspension used in the composition per 100 Kg of cementitious material used in the composition. The amount of the aqueous suspension to form the compositions is also reported in % bwoc, which describes the percent of the The density for each of Comp. Nos. 1A and 1B was 1.91 Kg/L. The yield for each of Comp. Nos. 1A and 1B was 0.75 L/Kg, which describes the volume of slurry that would be obtained per Kg of cementitious material. The water requirement for each of Comp. Nos. 1A and 1B was 0.44 L/Kg, which describes the total water in the slurry per Kg of cementitious material.

Comp. No. 1A was prepared by adding 794 g of cementitious material to 350 g of water being stirred in a Waring blender at 4000 rpm at room temperature. The cementitious material was added to the water over a 15 second period. When all of the cementitious material was added to the water, a cover was placed on the blender and mixing was continued at about 12,000 RPM for 35 seconds.

Comp. No. 1B further included a chromate reducing agent formulated as an aqueous suspension that included zeolite, namely, an aqueous suspension having the concentrations of zeolite, water, and stannous sulfate as reported for Sample No. 8 in Table 1A.

Comp. No. 1B was prepared by adding the reported amount of the aqueous suspension of stannous sulfate to 347 g of water in a Waring blender at 4000 rpm at room temperature. Cementitious material in an amount of 789 g was added to the mixing fluid (water and aqueous zeolite suspension of stannous sulfate) being maintained in the Waring Blender at 4000 rpm. The cementitious material was added to the mixing fluid over a 15 second period. When all of the cementitious material was added to the water, a cover was placed on the blender and mixing was continued at about 12,000 RPM for 35 seconds.

A comparison of Comp. Nos. 1A and 1B illustrates that cement compositions comprising a chromate reducing agent that was added to the composition as an aqueous suspension are rheologically comparable to cement compositions that do not include a chromate reducing agent.

Composition Nos. 2A and 2B included a lightweight additive (Econolite™ liquid) in an amount of about 4.439 L/100 Kg of cementitious material, a dispersant (CFR-3L™) in an amount of about 0.266 L/100 Kg of cementitious material, and a retarder (HR-4L™) in an amount of about 2.308 L/100 Kg of cementitious material. The density for each of Comp. Nos. 2A and 2B was 1.44 Kg/L. The yield for each of Comp. Nos. 2A and 2B was 1.36 L/Kg, which describes the volume of slurry obtained per Kg of cementitious material. The water requirement for each of Comp. Nos. 2A and 2B was 1.68 L/Kg, which describes the total water in the slurry per Kg of cementitious material.

Comp. No. 2A was prepared by adding the reported amounts of lightweight additive, dispersant and retarder to 473 g of water being stirred in a Waring blender at 4000 RPM at room temperature. Cementitious material in an amount of 360 g was then added to the mixing fluid (the water, lightweight additive, dispersant and retarder) at 4000 RPM over a 15 second period. When all of the cementitious material was added to the mixing fluid, a cover was placed on the blender and mixing continued at about 12,000 RPM for 35 seconds.

Comp. No. 2B further included a chromate reducing agent formulated as an aqueous suspension that included zeolite, namely, an aqueous suspension having the concentrations of zeolite, water, and stannous sulfate as reported for Sample No. 8 in Table 1A.

Comp. No. 2B was prepared by adding the reported amount of the aqueous suspension to 472 g of water being stirred in a Waring blender at 4000 rpm at room temperature. The lightweight additive, dispersant and retarder were then added to the Waring blender. Cementitious material in an amount of 358 g was added to the mixing fluid (the water, aqueous suspension of chromate reducing agent, lightweight additive, dispersant and retarder) at 4000 RPM over a 15 second period. When all of the cementitious material was added to the mixing fluid, a cover was placed on the blender and mixing was continued at about 12,000 RPM for 35 seconds.

A comparison of Comp. Nos. 2A and 2B illustrates that cement compositions comprising a chromate reducing agent that was added to the composition as an aqueous suspension have rheology, thickening times and free water data comparable to cement compositions that do not include a chromate reducing agent.

Each of Comp. Nos. 3A and 3B included a chromate reducing agent formulated as an aqueous suspension that included zeolite, namely, an aqueous suspension having the concentrations of zeolite, water, and stannous sulfate as reported for Sample No. 8 in Table 1A.

Each of Comp. Nos. 3A and 3B also included a strength retrogression agent (SSA-1™) in an amount of 35% by weight of cementitious material (bwoc), bentonite in an amount of 2.5% bwoc, and a retarder (HR-4L™) in an amount of 0.533 L/100 Kg of cementitious material.

The density for each of Comp. Nos. 3A and 3B was 1.62 Kg/L. The yield for each of Comp. Nos. 3A and 3B was 1.49 L/Kg, which describes the volume of slurry obtained per Kg of cementitious material. The water requirement for each of Comp. Nos. 3A and 3B was 1.03 L/Kg, which describes the total water in the slurry per Kg of cementitious material.

Comp. Nos. 3A and 3B were prepared by adding the reported amounts of the aqueous suspension to 412 g of water being stirred in a Waring blender at 4000 RPM at room temperature. The retarder was then added to the Waring blender. Four hundred and four (404) g of cementitious material was dry blended in a jar with the strength retrogression agent and bentonite. The dry blended mix was added to the mixing fluid (the aqueous suspension of chromate reducing agent, water and retarder) at 4000 RPM over a 15 second period. When all of the cementitious material was added to the mixing fluid, a cover was placed on the blender and mixing was continued at about 12,000 RPM for 35 seconds.

A comparison of Comp. Nos. 3A and 3B illustrates that cement compositions comprising a chromate reducing agent that was added to the composition as an aqueous suspension have acceptable rheology and thickening times at a variety of temperatures.

The density for each of Comp. Nos. 4A and 4B was 1.91 Kg/L. The yield for each of Comp. Nos. 4A and 4B was 0.76 L/Kg, which describes the volume of slurry obtained per Kg of cementitious material. The water requirement for each of Comp. Nos. 4A and 4B was 0.45 L/Kg, which describes the total water in the slurry per Kg of cementitious material.

Comp. No. 4A was prepared by adding 793 g of cementitious material to 350 g of water being stirred in a Waring blender at 4000 rpm at room temperature. The cementitious material was added to the water over a 15 second period. When all of the cementitious material was added to the water, a cover was placed on the blender and mixing continued at about 12,000 RPM for 35 seconds.

Comp. No. 4B further included a chromate reducing agent formulated as an aqueous suspension that included zeolite, namely, an aqueous suspension having the concentrations of zeolite, water, and ferrous sulfate as reported for Sample No. 9 in Table 1A.

Comp. No. 4B was prepared by adding the reported amount of the aqueous suspension of ferrous sulfate to 344 g of water being stirred in a Waring blender at 4000 rpm at room temperature. Cementitious material in an amount of 789 g was added to the mixing fluid (the water and the aqueous suspension of chromate reducing agent) at 4000 RPM over a 15 second period. When all of the cementitious material was added to the mixing fluid, a cover was placed on the blender and mixing was continued at about 12,000 RPM for 35 seconds.

A comparison of Comp. Nos. 4A and 4B illustrates that cement compositions comprising a chromate reducing agent that was added to the composition as an aqueous suspension have rheology and thickening times comparable to cement compositions that do not include a chromate reducing agent.

Composition Nos. 5A and 5B included a lightweight additive (Econolite™ liquid) in an amount of about 4.439 L/100 Kg of cementitious material, a dispersant (CFR-3L™)

in an amount of about 0.178 L/100 Kg of cementitious material, and a retarder (HR-4L™) in an amount of about 2.308 L/100 Kg of cementitious material. The density for each of Comp. Nos. 5A and 5B was 1.44 Kg/L. The yield for each of Comp. Nos. 2A and 2B was 1.60 L/Kg, which describes the volume of slurry obtained per Kg of cementitious material. The water requirement for each of Comp. Nos. 5A and 5B was 1.29 L/Kg, which describes the total water in the slurry per Kg of cementitious material.

Comp. No. 5A was prepared by adding the reported amounts of lightweight additive, dispersant and retarder to 454 g of water being stirred in a Waring blender at 4000 RPM at room temperature. Cementitious material in an amount of 377 g was then added to the mixing fluid (the water, lightweight additive, dispersant and retarder) at 4000 RPM over a 15 second period. When all of the cementitious material was added to the mixing fluid, a cover was placed on the blender and mixing was continued at about 12,000 RPM for 35 seconds.

Comp. No. 5B further included a chromate reducing agent formulated as an aqueous suspension that included zeolite, namely, an aqueous suspension having the concentrations of zeolite, water, and ferrous sulfate as reported for Sample No. 9 in Table 1A.

Comp. No. 5B was prepared by adding the reported amount of the aqueous suspension of ferrous sulfate to 451 g of water being stirred in a Waring blender at 4000 rpm at room temperature. The lightweight additive, dispersant and retarder were then added to the Waring Blender. Cementitious material in an amount of 375 g was added to the mixing fluid (the water, aqueous suspension of chromate reducing agent, lightweight additive, dispersant and retarder) at 4000 RPM over a 15 second period. When all of the cementitious material was added to the mixing fluid, a cover was placed on the blender and mixing was continued at about 12,000 RPM for 35 seconds.

A comparison of Comp. Nos. 5A and 5B illustrates that cement compositions comprising a chromate reducing agent that was added to the composition as an aqueous suspension have rheology, thickening times and free water data comparable to cement compositions that do not include a chromate reducing agent.

Composition Nos. 6A-7B included a strength retrogression agent (SSA-1™) in an amount of 35% by weight of the cement (bwoc), bentonite in an amount of 3.00% bwoc, and a retarder (HR-4L™) in an amount of 0.533 L/100 Kg of cementitious material. The density for each of Comp. Nos. 6A-7B was 1.62 Kg/L. The yield for each of Comp. Nos. 6A-7B was 1.50 L/Kg, which describes the volume of slurry obtained per Kg of cementitious material. The water requirement for each of Comp. Nos. 6A-7B was 1.04 L/Kg, which describes the total water in the slurry per Kg of cementitious material.

Comp. Nos. 6A and 7A were prepared by adding the retarder to 412 g of water being stirred in a Waring blender at 4000 RPM at room temperature. Four hundred and four (404) g of cementitious material was dry blended in a jar with the strength retrogression agent and bentonite. The dry blended mix was added to the mixing fluid (the water and retarder) at 4000 RPM over a 15 second period. When all of the cementitious material was added to the mixing fluid, a cover was placed on the blender and mixing was continued at about 12,000 RPM for 35 seconds.

Comp. Nos. 6B and 7B further included a chromate reducing agent formulated as an aqueous suspension that included zeolite, namely, an aqueous suspension having the concentrations of zeolite, water, and ferrous sulfate as reported for Sample No. 9 in Table 1A.

Comp. Nos. 6B and 7B were prepared by adding the reported amounts of the aqueous suspension of ferrous sulfate to 410 g of water being stirred in a Waring blender at 4000 RPM at room temperature. The retarder was then added to the Waring blender. Four hundred and one (401) g of cementitious material was dry blended in a jar with the strength retrogression agent and bentonite. The dry blended mix was added to the mixing fluid (the aqueous suspension of chromate reducing agent, water and retarder) at 4000 RPM over a 15 second period. When all of the cementitious material was added to the mixing fluid, a cover was placed on the blender and mixing was continued at about 12,000 RPM for 35 seconds.

A comparison of Comp. Nos. 6A-7B illustrates that cement compositions comprising a chromate reducing agent added to composition as an aqueous suspension that includes zeolite have acceptable rheology and thickening times at a variety of temperatures.

The compressive strengths of Comps Nos. 5A, 5B, 7A and 7B were determined according to Non-Destructive Sonic Testing as set forth in Section 7 of API Recommended Practice 10B, 22nd Edition, 1997, of the American Petroleum Institute, which is a text known and available to those of ordinary skill in the art. The results are reported in Table 3B.

TABLE 3B

| Compressive Strength (psi) | No. 5A at 123° C. | No. 5B at 123° C. | No. 7A at 98° C. | No. 7B at 98° C. |
| --- | --- | --- | --- | --- |
| 12 hr | 226 | 241 | 53 | 40 |
| 24 hr | 420 | 410 | 490 | 423 |

Comparisons of Comp. Nos. 5A to 5B, and 7A to 7B, illustrate that cement compositions comprising a chromate reducing agent that was added to the composition as an aqueous suspension can achieve compressive strengths, over a variety of temperatures, that are comparable to compressive strengths achieved by cement compositions that do not include a chromate reducing agent.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

The invention claimed is:

1. A method of cementing an area comprising:
    mixing a cementitious material with water and an aqueous suspension comprising water, zeolite and a chromate reducing agent to form a cement composition, wherein the aqueous suspension comprises zeolite in an amount of from about 67 to about 100 weight percent of the weight of the water, and chromate reducing agent in an amount of from about 42 to about 167 weight percent of the weight of the zeolite, and from about 28 to about 111 weight percent of the weight of the water in the aqueous suspension;
    placing the cement composition in the area; and
    allowing the cement composition to set therein.

2. The method of claim 1 wherein the zeolite is represented by the formula:

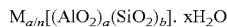

where M represents one or more cations selected from the group consisting of Na, K, Mg, Ca, Sr, Li, Ba, $NH_4$, $CH_3NH_3$, $(CH_3)_3NH$, $(CH_3)_4N$, Ga, Ge and P; n represents the cation valence; the ratio of b:a is in a range from greater than or equal to 1 and less than or equal to 5; and x represents the moles of water entrained into the zeolite framework.

3. The method of claim 1, wherein the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite.

4. The method of claim 1, wherein the chromate reducing agent is selected from the group consisting of stannous sulfate and ferrous sulfate, and hydrates thereof.

5. The method of claim 1, wherein the aqueous suspension comprises zeolite in an amount of more than about 67 weight percent to less than about 100 weight percent of the weight of the water, and chromate reducing agent in an amount that is about 111 weight percent of the weight of the water, and more than about 100 weight percent to about 167 weight percent of the weight of the zeolite.

6. The method of claim 1, wherein the aqueous suspension comprises zeolite in an amount of about 67 to about 100 weight percent of the weight of the water, and chromate reducing agent in an amount that is from more than about 100 weight percent to about 111 weight percent of the weight of the water, and about 167 weight percent of the weight of the zeolite.

7. The method of claim 1, wherein the aqueous suspension comprises zeolite in an amount of about 67 weight percent of the weight of the water, and chromate reducing agent in an amount that is from about 56 to about 111 weight percent of the weight of the water, and from about 83 to about 167 weight percent of the weight of the zeolite.

8. The method of claim 1, wherein the cement composition comprises up to about 0.5% of the chromate reducing agent by weight of the cementitious material.

9. The method of claim 1 wherein the cementitious material comprises at least one member selected from the group consisting of micronized cement, Portland cement, pozzolan cement, gypsum cement, aluminous cement, silica cement, and alkaline cement.

10. The method of claim 1 wherein the area comprises a wellbore penetrating a subterranean zone.

11. A method of cementing an area comprising:
mixing a cementitious material with water and an aqueous suspension comprising water, zeolite and a chromate reducing agent to form a cement composition, wherein the aqueous suspension comprises zeolite in an amount of from about 48 to about 150 weight percent by weight of the water, and chromate reducing agent in an amount of from about 103 to about 167 weight percent by weight of the zeolite and from about 49 to about 167 weight percent by weight of the water in the aqueous suspension;
placing the cement composition in the area; and
allowing the cement composition to set therein.

12. The method of claim 11 wherein the zeolite is represented by the formula:

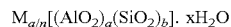

where M represents one or more cations selected from the group consisting of Na, K, Mg, Ca, Sr, Li, Ba, $NH_4$, $CH_3NH_3$, $(CH_3)_3NH$, $(CH_3)_4N$, Ga, Ge and P; n represents the cation valence; the ratio of b:a is in a range from greater than or equal to 1 and less than or equal to 5; and x represents the moles of water entrained into the zeolite framework.

13. The method of claim 11, wherein the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite.

14. The method of claim 11, wherein the chromate reducing agent is selected from the group consisting of stannous sulfate and ferrous sulfate.

* * * * *